United States Patent [19]

Elmore et al.

[11] Patent Number: 4,673,459
[45] Date of Patent: Jun. 16, 1987

[54] RADIAL CONFIGURATION OF EVAPORATOR HEATING ELEMENTS AND METHOD

[75] Inventors: Carl L. Elmore; Paul Sherman; Daniel A. McGrath, all of Glens Falls, N.Y.

[73] Assignee: Kamyr, Inc., Glens Falls, N.Y.

[21] Appl. No.: 746,092

[22] Filed: Jun. 18, 1985

[51] Int. Cl.$^4$ .......................... B01D 1/22; B01D 1/26
[52] U.S. Cl. ................... 159/13.1; 159/20.1; 159/28.6; 159/43.1; 159/49; 202/174; 202/236; 202/268; 203/89; 203/98
[58] Field of Search ............ 159/13.1, 13.3, 20.1, 159/DIG. 31, 17.1, 28.6, 28.1, 43.1, 49, 47.3, 1.1; 202/236, 174, 235, 266, 268; 203/25, 4, 72, 89, DIG. 22, 99, 98; 165/101, 100

[56] References Cited

U.S. PATENT DOCUMENTS

| | | | |
|---|---|---|---|
| 344,586 | 6/1886 | Lillie | 159/13.3 |
| 470,060 | 3/1892 | Lillie | 159/43.1 |
| 2,473,641 | 6/1949 | Feldstein | 159/28.6 |
| 3,004,590 | 10/1961 | Rosenblad | 159/13.3 |
| 3,214,350 | 10/1965 | Lichtenstein | 159/28.6 |
| 3,227,630 | 1/1966 | Beckman | 159/17.1 |
| 3,261,392 | 7/1966 | Jacoby | 159/20.1 |
| 3,351,119 | 11/1967 | Rosenblad | 159/13.1 |
| 3,366,158 | 1/1968 | Rosenblad | 159/13.3 |
| 3,371,709 | 3/1968 | Rosenblad | 159/28.6 |
| 3,512,239 | 5/1970 | Rosenblad | 29/157.3 |
| 3,741,879 | 6/1973 | Best | 159/13.3 |
| 3,808,104 | 4/1974 | Davidson | 159/28.6 |
| 3,849,232 | 11/1974 | Kessler et al. | 159/43.1 |
| 3,852,166 | 12/1974 | Palmason | 159/28.6 |
| 4,216,002 | 8/1980 | Rosenblad | 159/13.3 |

FOREIGN PATENT DOCUMENTS 100923 1/1899 Fed. Rep. of Germany ..... 159/28.6

OTHER PUBLICATIONS

Kamyr Brochure "Rosenblad ® Free Flow Evaporators", Apr. 1983.

*Primary Examiner*—Wilbur Bascomb
*Attorney, Agent, or Firm*—Nixon & Vanderhye

[57] ABSTRACT

A free flow evaporator of the falling film type has the heating elements disposed in a circular configuration so that each extends radially a distance less than the interior radius of the evaporator cylindrical vessel. Heating vapor is introduced concentrically into the top of the vessel and passes into the tops of the heating elements, and condensate is withdrawn from the bottoms of the heating elements in the vessel. Excess vapor passes through a vapor vent in the bottom of the vessel. The boiling liquid, such as black liquor from paper pulp processing, is introduced through a header above an annular channel with a perforated plate bottom, the perforated plate being disposed on top of the heating elements. The evaporated liquid vapor passes radially outwardly in the vessel, and then upwardly, and is discharged from the top of the vessel and passes to the top of another vessel (providing another effect), to provide heating vapor to the other vessel.

17 Claims, 3 Drawing Figures

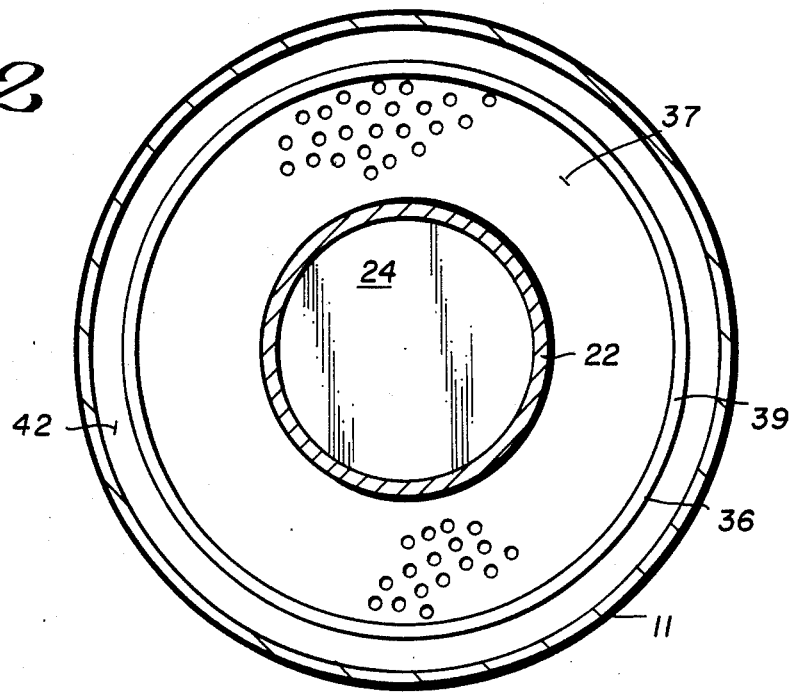
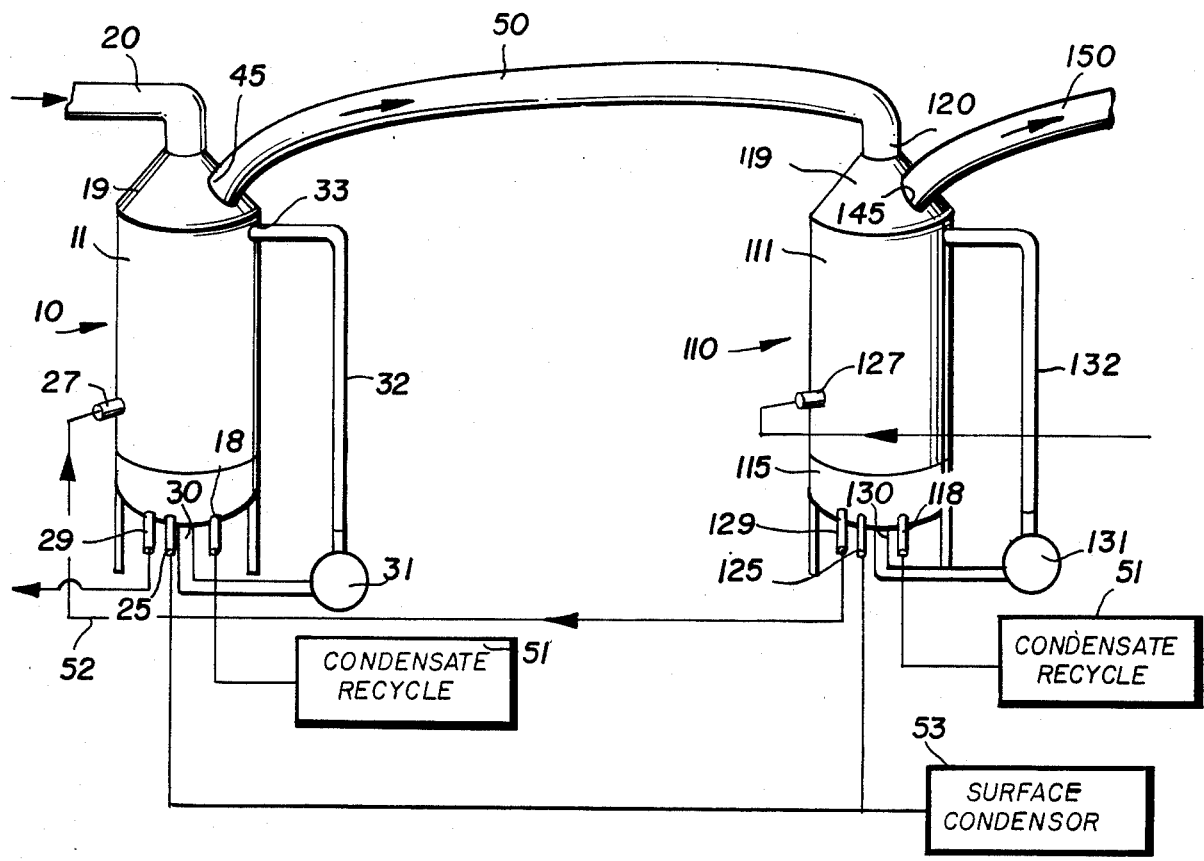

RADIAL CONFIGURATION OF EVAPORATOR HEATING ELEMENTS AND METHOD

BACKGROUND AND SUMMARY OF THE INVENTION

Conventional free flow evaporators of the falling film type are typically interconnected to provide a number of effects to evaporate a wide variety of liquids. The evaporators are used successfully in many installations, including in the evaporation of black liquor in paper pulp producing facilities.

In a typical free flow evaporator, the heating elements (which are such as shown in U.S. Pat. No. 3,512,239) are disposed in parallel in linear banks within a cylindrical upright vessel. Steam, or other heating vapor, is introduced into each of the heating elements through a header located at the bottom of the vessel, the steam then proceeding upwardly inside each of the heating elements and condensing. The condensate flows downwardly in a countercurrent flow, and is removed through an outlet at the bottom of the heating elements below the level of the steam introduction. Boiling liquor, such as black liquor, is introduced at an intermediate location in the vessel, and is recirculated from a pool at the bottom of the vessel to the top of the vessels and flows in a thin film over both sides of each heating element. A portion of the liquor falling in the film over the heating elements is boiled off to produce a vapor, and the boiled vapor moves horizontally in the vessel, then flows upwardly to an entrainment separator, and then passes through a vapor outlet in the top of the vessel.

While conventional free flow evaporators perform their boiling function very efficiently, there are a number of drawbacks associated therewith. For instance, because the heating elements are arranged in a rectangular array, the packing of the elements within the vessel is not particularly efficient. Also, since the heating vapor enters the bottom of each vessel in a multi-effect array, and exits from the top, substantial lengths of duct must be provided leading from the top of each effect to the bottom of the next effect in series. Heat loss occurs in such long ducts. Additionally, water hammer can occur since the steam enters the bottom of the elements and condensate also leaves through the same structure that introduces the heating vapor. Because a common conduit functions as both the heating vapor inlet and a condensate outlet, the height of the inlet cuts (cutout portions of headers, which cutouts form the heating vapor inlets) of the heating elements are larger than necessary merely for heating vapor introduction since they must ensure that the condensate does not flood out the inlet vapor introduction.

According to the present invention an evaporator, and a method of evaporating a liquid, are provided which overcome the drawbacks associated with conventional free flow evaporating techniques (as set forth above), and provide additional advantages. The two most basic aspects of the evaporator according to the present invention are the provision of the heating elements in a radial configuration so that they are collectively concentric with the vessel and each extends radially within the vessel, and the provision of the heating vapor inlet concentrically at the top of the vessel, with the evaporated vapor outlet still remaining at the top, and the condensate drains to the bottom.

By providing a round package of heating elements in the cylindrical (round) vessel, the symmetry of the design is enhanced and allows more heating elements to be placed within a given diameter vessel, therefore allowing the diameter of the evaporator vessel to be smaller. Also, since in the evaporators according to the present invention, the vapor both enters and leaves from the top of the tank less duct work is necessary (and thus less heat loss) to connect adjacent effects together. Also, the particular positioning of the heating vapor inlet and the circular array of heating elements allows the heating elements to be supported on a bottom beam in such a way that they can expand upwardly. Still further, since the steam enters at the top and the condensate leaves at the bottom a water hammer will not occur, and an additional benefit of the vapor inlet being distinct from the condensate outlet is that the height of the inlet cuts of the heating elements may thus be made much smaller, and smaller inlets are less expensive. Finally, the radial arrangement of the heating elements provides a much stronger design of the elements' package than parallel heating elements, and thus allows a simpler—and less expensive—heating vapor inlet header design.

It is the primary object of the present invention to provide an improved free flow evaporator, and method of evaporating a liquid utilizing interconnected evaporator effects. This and other objects of the invention will become clear from an inspection of the detailed description of the invention, and from the appended claims.

BRIEF DESCRIPTION OF THE DRAWINGS

FIG. 2 is a horizontal cross-sectional view taken just below the boiling liquor inlet at the top of the evaporator of FIG. 1; and FIG. 3 is a schematic view illustrating the interconnections of two of the evaporators of FIG. 1 in a multi-effect arrangement.

DETAILED DESCRIPTION

Figure 1:
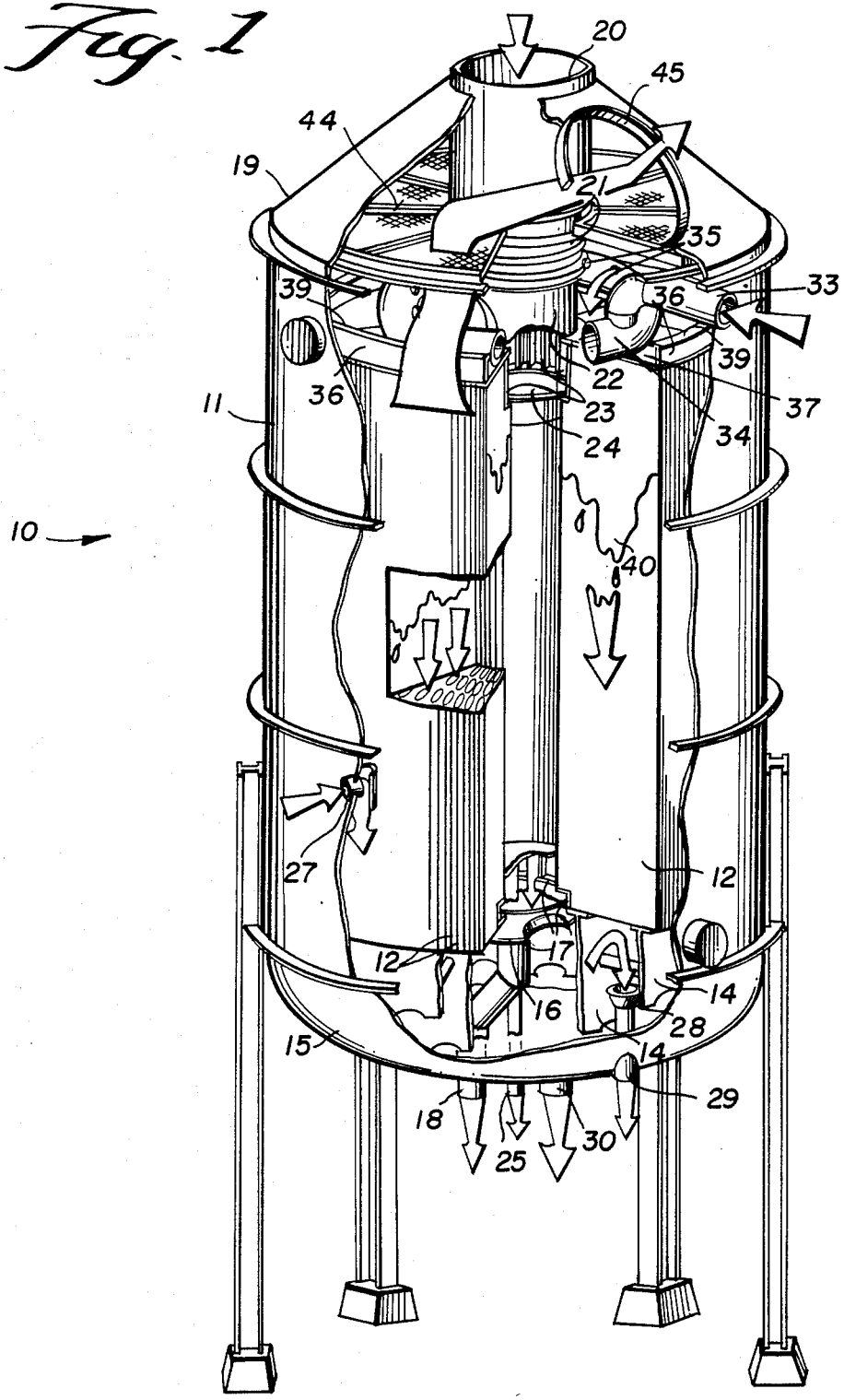
FIG. 1 is a top schematic perspective view, with portions cut away for clarity of illustration, of an exemplary free flow evaporator according to the present invention.

An exemplary free flow evaporator according to the present invention is illustrated generally by reference numeral 10 in the drawings. The main component of the evaporator 10 is a circular cross-section upright cylindrical vessel 11. Within the vessel 11 are mounted a plurality of heating elements 12. Each heating element comprises a pair of spaced generally parallel plates defining a vapor-tight interior volume, and preferably the plates are of the dimpled type, such as shown in U.S. Pat. No. 3,512,239 (the disclosure of which is hereby incorporated by reference herein). The heating elements 12 are mounted in a radial configuration, as illustrated, so that they are collectively concentric with the vessel 11 and each extends radially a distance less than the interior radius of the vessel, and so that they are circumferentially spaced from each other (e.g., about one inch) so that boiling liquor can flow in a film over both exterior faces of the plates forming each heating element 12.

The means for mounting the element 12 preferably comprises the simple annular beams 14 disposed adjacent the bottom 15 of the vessel 11, on which the heating elements 12 rest. Also at the center of the vessel 11 a hollow core is provided, which terminates in the annular condensate outlet structure 16. Structure 16 is operatively connected to and cooperates with the condensate outlet header 17, and condensate drain 18, mounted at the bottom central portions of the heating elements 12, and providing for the drain of condensate from the bottom interior portions of the heating elements 12. The heating elements 12 are also stabilized at the tops thereof by structure to be described further with respect to the heating vapor introduction and boiling liquor introduction structures.

Heating vapor, such as steam in the first effect in a series, or evaporated liquor vapor in subsequent effects, is introduced into the vessel 10 adjacent the top 19 thereof. Preferably the heating vapor is introduced by the simple vapor inlet illustrated in FIG. 1, which comprises a circular cross-section pipe 20 that is concentric with the vessel 11 and is mounted by an expansion joint 21 (of any desirable design, such as a bellows design) to a stationary circular cross-section pipe 22 mounted within the central core of the vessel 11. The pipe 22 communicates with the interiors of the heating elements 12, a plurality of "inlet cuts" of a header arrangement 23 being provided. The "inlet cuts" are cutout portions of the header 23, which cutouts form the heating vapor inlets. These "inlet cuts" are smaller than in conventional free flow evaporators that have the heating vapor introduction at the bottom thereof since there is no possibility of condensate flooding impeding introduction of the heating vapor into the heating elements when utilizing the evaporator 10 according to the present invention. Located at the bottom of the pipe 22 is a convex termination surface 24 which stops the downward flow of the heating vapor introduced into inlet 20. If the amount of introduced heating vapor is greater than the capacity of the heating elements 12, then a part of it will exit the vessel 11 through the vapor vent 25 after it has passed through elements 12. From the vapor vent 25 it may pass to any other suitable structure.

The liquor to be boiled by the evaporator 10, such as black liquor in paper pulp producing facilities, is introduced into the vessel 11 through the inlet 27 usually, but not necessarily, vertically spaced from the bottom 15 of the vessel 11, so that the introduced liquor flows down the interior wall of the vessel 11 to the dish-shaped bottom 15 wherein it collects in a pool. The inlet 27 is spaced from the funnel-shaped top 28 of a transfer outlet pipe 29.

Boiling liquor that collects in a pool at the bottom 15 of the vessel 11 exits circulation outlet pipe 30 at the lowermost point of the vessel bottom 15, and is pumped as by a centrifugal pump 31 (see FIG. 3) in a circulation conduit 32 to the circulation inlet 33 adjacent, but preferably just below, the top 19 of the vessel 11. From the inlet 33 the boiling liquor passes into doughnut-shaped liquid header 34 which has a plurality of openings 35 formed in the interior surface thereof. Liquor flowing through the openings 35 falls into an annular channel-shaped structure 36 which includes a bottom plate 37 that is perforated (the perforations are visible in FIG. 2), and includes an outer annular top lip 39. The plate 37 is welded to pipe 22 so that pipe 22 forms the inner wall of channel structure 36. This construction of the header 34 and the annular member 36 provides an even distribution of liquor to flow downwardly over the sides of the heating elements 12 in a thin film, as illustrated schematically at 40 in FIG. 1.

As the thin film 40 passes over the exterior surfaces of the heating elements 12, a portion thereof is evaporated. The evaporated liquor vapor passes radially outwardly in the vessel 11 to the annular chamber 42 (see FIG. 2) between the vessel wall 11 and the radially outwardmost portions of the heating elements 12, and the annular top structure 36. The vapor from this annular channel 42 then passes upwardly through entrainment separator 44 into the top 19 of the vessel 11, and ultimately passes out the evaporated liquor vapor outlet 45.

The vessel 11 is typically interconnected to a number of different other effects of a multiple effect evaporator array. For example, eight effects may be interconnected together, with the heating vapor comprising steam in the first effect and passing from the first to the eighth effect, while the boiling liquor is introduced in its least concentrated form in the eighth effect, and passes to the first effect being concentrated in each effect. A typical interconnection between two effects is illustrated in FIG. 3, one of the effects being provided by the evaporator 10 and another, higher, evaporator effect 110. For instance, the evaporator 10 could be the second effect of an eight-effect evaporator array, and the evaporator 110 the third effect. The evaporator 110 structures comparable to those for the evaporator 10 are designated by the same reference numeral only preceded by a "1".

The evaporated liquor vapor outlet 45 from the evaporator 10 is connected by a conduit 50 to the heating vapor inlet 120 of the evaporator 110. Condensate which drains through condensate outlet pipe of evaporator 10 is passed to a condensate recycle station 51. When the level of the boiling liquid in the vessel 111 is above the funnel-shaped top of the transfer outlet pipe 129 thereof, the boiling liquor flows into conduit 52, and ultimately flows (or is pumped) into the boiling liquor inlet 27 and the vessel 11. Any excess vapor passing out of vapor vents 25, 125, passes to a surface condenser 53, or other structure which utilizes the heat value remaining in the vapor. The transfer outlet 29 of the vessel 11 is connected to the boiling liquor inlet of the previous (e.g., first) effect, while the evaporated liquor vapor outlet 145 of the vessel 111 is connected to a conduit 150 which is in turn connected to the heating vapor inlet at the top of the next (e.g., fourth) effect.

Operation

Utilizing the evaporators 10, 110, and with particular reference to evaporator 10, it will thus be seen that an efficient method of evaporating a liquid is provided. The method comprises the steps of introducing heating vapor into the top of the first vessel 10 through conduit 20 so that it enters the heating elements 12. Withdrawing condensate formed by cooling of the heating vapor through the structures 16, 18 at the bottom of the vessel 10. Introducing liquor to be evaporated through the inlet 33 and header 34 adjacent the top of the heating elements 12 so that it flows through the headers 34 onto the perforated plate 37 and as a thin film down the outsides of the heating elements, with a portion thereof evaporating to form a resultant vapor. Withdrawing the resultant vapor from the top 19 of the vessel 11, through the outlet 45, and passing it to the top 119 of the next vessel 111, to be introduced through heating vapor inlet 120 for that vessel 111. The boiling liquor in the pool at the bottom 115 of the vessel 111 flows through transfer outlet 129 in conduit 52 to the boiling liquor inlet 27 to the vessel 11. Condensate from both evaporators 10, 110, is passed to condensate recycle 51, and any excess heating vapor (i.e., that which does not condense within the heating elements) passes through the bottoms of the vessels 11, 111 in tubes 25, 125 to a surface condenser 53 or the like. Due to the provision of the expansion joint 21 between the heating vapor inlet 20 and the pipe 22 for facilitating introduction of the heating vapor through inlets 23 into the heating elements 12, vertical expansion of the heating elements 12 is facilitated without harm to the evaporator, and the provision of the annular supporting beams 14 allows for horizontal (radial) expansion of the heating elements 12.

It will thus be seen that according to the present invention an evaporator has been provided which allows more heating elements to be disposed in a given diameter vessel than for conventional parallel heating element designs. Also according to the present invention the length of the duct (such as ducts 50, 150) between effects is significantly shorter than for evaporators wherein heating vapor introduction is at the bottom and evaporated liquor vapor is removed from the top. Also a water hammer will not occur in the evaporator according to the present invention, and the heating vapor inlet is simpler, with smaller inlet cuts, and less expensive.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A free flow evaporator comprising:
   a circular cross-section upright cylindrical vessel;
   a plurality of heating elements disposed in said vessel and each heating element comprising a pair of spaced generally parallel plates defining a vapor-tight interior volume and each distinct from the vapor-tight interior volumes of the other heating elements;
   means for mounting said heating elements in a radial configuration so that they are collectively concentric with the vessel, and each extends radially a distance less than the interior radius of the vessel, and so that the heating elements are circumferentially spaced from, and distinct from, each other;
   means for introducing heating vapor to the interior volumes of said heating elements;
   means for withdrawing condensate from the interior volumes of said heating elements;
   means for introducing liquor to be evaporated adjacent the tops of said heating elements so that it flows downwardly in a thin film over the exteriors of said heating elements; and
   means for discharging evaporated liquor vapor from said vessel; and
   wherein said means for introducing heating vapor to the interiors of said elements comprises means for introducing the heating vapor concentrically into the top of said vessel, and an annular header communicating with said elements and said concentric introduction means.

2. An evaporator as recited in claim 1 wherein said means for withdrawing condensate from the interior volumes of said heating elements withdraws the condensate from the bottom of said heating elements, and from the bottom of said vessel.

3. An evaporator as recited in claim 2 wherein said means for discharging evaporated liquor vapor from said vessel comprises an outlet disposed in the top of said vessel, offset radially from said heating vapor inlet.

4. An evaporator as recited in claim 3 wherein said means for mounting said heating elements comprises beam means disposed adjacent the bottom of said vessel and on which said heating elements rest, said heating elements movable with respect to said beam means to provide for radial expansion of the heating elements.

5. An evaporator as recited in claim 4 further comprising expansion joint means operatively connecting said heating vapor inlet to said heating elements so that said heating elements may expand and contract vertically in said vessel.

6. An evaporator as recited in claim 5 wherein said means for introducing liquid to be evaporated adjacent the tops of said heating elements comprises a perforated annular plate disposed at the tops of said heating elements, and a generally doughnut-shaped header disposed above said perforated annular plate so that liquid from said header flows onto said plate and passes through the perforations in said plate to flow over said heating elements.

7. An evaporator as recited in claim 6 wherein said perforated plate comprises the bottom of an annular channel-shaped member, including annular lip means at the top thereof, said annular channel being concentric with said vessel.

8. An evaporator as recited in claim 7 further comprising a vapor vent extending concentrically within said vessel and exiting said vessel at the bottom thereof.

9. An evaporator as recited in claim 1 wherein said means for mounting said heating elements comprises beam means disposed adjacent the bottom of said vessel and on which said heating elements rest, said heating elements movable with respect to said beam means to provide for radial expansion of the heating elements.

10. An evaporator as recited in claim 9 further comprising expansion joint means operatively connecting said heating vapor inlet to said heating elements so that said heating elements may expand and contract vertically in said vessel.

11. An evaporator as recited in claim 1 wherein said means for introducing liquid to be evaporated adjacent the tops of said heating elements comprises a perforated annular plate disposed at the tops of said heating elements, and a generally doughnut-shaped header disposed above said perforated annular plate so that liquid from said header flows onto said plate and passes through the perforations in said plate to flow over said heating elements.

12. An evaporator as recited in claim 11 wherein said perforated plate comprises the bottom of an annular channel-shaped member, including annular lip means at the top thereof, said annular channel being concentric with said vessel.

13. An evaporator as recited in claim 3 further comprising a vapor vent extending concentrically within said vessel and exiting said vessel at the bottom thereof.

14. A method of evaporating a liquid utilizing a first upright vessel which is circular in cross-section and cylindrical, and a second upright vessel, each vessel having a plurality of horizontally spaced, vertically extending evaporator heating elements disposed therein, comprising the steps of:

(a) introducing heating vapor into the top of the first vessel so that is enters the heating elements from the tops thereof;
(b) withdrawing condensate formed by cooling of heating vapor from the bottoms of the vessels;
(c) introducing liquid to be evaporated adjacent the tops of the heating elements in each of the vessels so that the liquid flows as a thin film down the outside surfaces of the heating elements, and a portion thereof evaporates to form a resultant vapor;
(d) recirculating liquid that does not form a resultant vapor, so that it again flows as a thin film down the outside surfaces of the heating elements;
(e) withdrawing the resultant vapor from the top of the first vessel and passing it to the top of the second vessel to provide heating vapor introduction into the tops of the heating elements of the second vessel; and
wherein steps (a) and (b) and (e) are practiced so that the heating vapor passes concentrically into the top of the first vessel, then passes radially in the vessel in all directions to enter the heating elements, and then passes downwardly in the heating elements; and wherein the condensate passes downwardly in the heating elements, and then flows radially inwardly toward the center of the vessel, and then passes downwardly at a central portion of the vessel; and wherein the resultant vapor passes radially outwardly from the heating elements, and then moves upwardly in an annular channel between the vessel and the heating elements, and then passes through a resultant vapor outlet in the top of the vessel.

15. A method as recited in claim 14 comprising the further step of venting excess heating vapor introduced into the first vessel from the bottom of the first vessel.

16. A method as recited in claim 15 comprising the further step of providing for vertical expansion or contraction of the heating elements without adversely impacting upon a vapor inlet for introducing the heating vapor into the top of the first vessel.

17. A method as recited in claim 14 wherein the liquid being evaporated is black liquor from paper pulp producing processing.

* * * * *